United States Patent [19]

Isozaki et al.

[11] 4,033,920

[45] July 5, 1977

[54] PROCESS FOR PRODUCING UNSATURATED RESIN EMULSION

[75] Inventors: Osamu Isozaki; Tadashi Watanabe; Masahiro Sakamoto, all of Hiratsuka, Japan

[73] Assignee: Kansai Paint Company, Ltd., Japan

[22] Filed: June 10, 1975

[21] Appl. No.: 585,770

[30] Foreign Application Priority Data

June 14, 1974 Japan .............................. 49-67698
July 1, 1974 Japan .............................. 49-75166

[52] U.S. Cl. .................. 260/29.6 H; 260/29.6 PM; 260/29.6 AT; 260/29.6 T; 260/29.6 TA
[51] Int. Cl.$^2$ .......................................... C08L 33/02
[58] Field of Search ............. 260/29.6 PM, 29.6 H, 260/29.6 AT, 836, 78.4 EP, 89.5 S, 29.6 T, 29.6 TA; 204/159.22, 159.14, 159.16

[56] References Cited

UNITED STATES PATENTS

| 3,236,795 | 2/1966 | Graver .................. 260/33.4 EP |
| 3,449,281 | 6/1969 | Sullivan et al. ................ 260/836 |
| 3,641,210 | 2/1972 | Wellers et al. ................ 260/836 |
| 3,847,846 | 11/1974 | Asada ........................ 204/159.22 |
| 3,929,935 | 12/1975 | Kinstle ....................... 204/159.16 |

Primary Examiner—M. J. Welsh
Attorney, Agent, or Firm—Ostrolenk, Faber, Gerb & Soffen

[57] ABSTRACT

A process for producing an aqueous emulsion of unsaturated resin suitable for radiation curing coating compositions comprises the steps of: synthesizing polyvinyl resin having an acid value of 50 to 230 by solution polymerization, adding a monomer having both epoxy group and reactive unsaturated group to said polyvinyl resin, if necessary further mixing a monomer of above 190° C in boiling point having reactive unsaturated group(s) to the above adduct, removing solvent under reduced pressure, neutralizing residual acid groups with base and dispersing the neutralized product into water.

8 Claims, No Drawings

PROCESS FOR PRODUCING UNSATURATED RESIN EMULSION

BACKGROUND OF THE INVENTION

This invention relates to a process for producing an aqueous emulsion of unsaturated resin having reactive unsaturated groups.

In recent years, the method for curing coating films by means of radiant rays such as electron beams and ultraviolet rays has been widely noted and the development of unsaturated resins suitable for such method has been undertaken. When the conventional unsaturated resins are used for vehicles of varnishes or enamels, they are usually diluted with reactive unsaturated monomers or common organic solvents. The coating composition prepared therefrom are than applied to the surfaces of substrates and the radiant energy such as electron beams or ultraviolet rays is applied to the coated surfaces so as to form a cross-linked coating film.

Advantages of radiation curing resin exist in the saving of resources and the prevention of environmental pollution, however, conventional coating compositions containing the radiation curing resin is far from these attributes, that is, the monomers and solvents contained in the coating composition are vaporized during the coating and curing operation. Accordingly, the unsaturated resins which do not give off the vapor of organic solvents, in other words, liquid high-boiling unsaturated oligomers or water-soluble or water-dispersible unsaturated resins are eagerly desired.

BRIEF SUMMARY OF THE INVENTION

In view of the above-mentioned facts, the present inventors have carried out eager and extensive studies and, as the result, have developed an improved water-dispersible unsaturated resin which is advantageously used for the solution of the above problems.

Accordingly, the primary object of the present invention is to provide an improved water dispersible unsaturated resin which is suitable for the preparation of radiation curing coating compositions.

A further object of the present invention is to provide an improved water dispersible unsaturated resin for a coating composition which does not give off noxious or unpleasant vapor of organic solvents during the coating process.

Still a further object of the present invention is to provide an improved water dispersible unsaturated resin for the preparation of a coating composition which forms coating films having excellent film properties such as smoothness, water resistance, impact resistance and so forth.

Furthermore, the object of the present invention is to provide a process for producing an aqueous emulsion of the above-mentioned unsaturated resin for the preparation of coating compositions.

According to the present invention, the process for producing the aqueous emulsion of unsaturated resin is characterized in that a high acid value polyvinyl resin having a number average molecular weight of about 10,000 to about 200,000 and an acid value of about 50 to about 230 is first synthesized by means of the conventional solution polymerization, a monomer having both epoxy group and reactive unsaturated group is then added to said poly vinyl resin having high acid value to produce an unsaturated resin having an acid value of 20 to 60 and unsaturation degree (molar quantity of reactive unsaturated groups per 1 kg of resin) of 0.5 to 3.0, then if necessary 5 to 60 parts by weight of the monomer having a boiling point of above 190° C and reactive unsaturated group(s) is further added to 100 parts of said unsaturated resin, the solvent in the reaction system is then removed under reduced pressure; thereafter the residual acid groups are neutralized with 0.4 to 1.2 equivalent of base, and the thus obtained neutralized product is lastly dispersed into water to form a novel aqueous emulsion of unsaturated resin.

DETAILED DESCRIPTION OF THE INVENTION

In the process for producing the unsaturated resin emulsion of the present invention, the solvent used for polymerization is placed in a four neck flask equipped with a condenser, nitrogen introducing device, thermometer, dropping funnel and stirrer, and the solvent is then heated to the polymerization temperature of about 50° to about 130° C, preferably about 60° to about 100° C, with continuous stirring and introducing of nitrogen gas. After the temperature is raised to the polymerization temperature, a mixture of polymerizable monomers containing thermal polymerization initiator is added dropwise to said polymerization solvent in the course of 2 to 4 hours. During this dropping, the temperature of the system should be maintained at the desired polymerization temperature. Further, as the case may be, an additional solution of thermal polymerization initiator can be added dropwise in the course of 20 to 60 minutes after the above dropping of monomers so as to improve the rate of polymerization. After that, the reaction mixture is allowed further to react at the same temperature for 3 to 6 hours and, thereby the synthesis of the high acid value polyvinyl resin is completed.

In the next step, the monomers having both epoxy group and reactive unsaturated group such as glycidyl acrylate and glycidyl methacrylate, a thermal polymerization inhibitor such as hydroquinone and a catalyst for the addition reaction of epoxy group and acid group are added to said high acid value polyvinyl resin and allowed to react for 2 to 5 hours at 80° to 140° C. As a result, the monomer having epoxy group and reactive unsaturated group is added to the acid groups of said high acid value polyvinyl resin and an unsaturated resin is produced. Further if necessary, 5 to 60 parts by weight, preferably 10 to 30 parts by weight, of a monomer of above 190° C in boiling point having reactive unsaturated group(s) is added to 100 parts by weight of said unsaturated resin.

The polymerization solvent contained in the above reaction mixture was then removed under reduced pressure of about 5 to about 20 mm Hg at a temperature of 80° to 120° C. By adding said monomer of above 190° C in boiling point having reactive unsaturated group(s) to said unsaturated resin, this solvent removal can be easily carried out since the viscosity of the reaction product is decreased by the addition of said monomers.

After the above elimination of the solvent, the residual acid groups of the resin is neutralized with a base and the mixture is then dispersed into distilled water with sufficient stirring to form a translucent or milky emulsion of the present invention.

The high acid value polyvinyl resin first synthesized in the process of the present invention is a copolymer having a number average molecular weight of about 10,000 to about 200,000, preferably about 40,000 to about 100,000, and an acid value of 50 to 230, and it is produced by copolymerizing one or more monomers selected from acrylic acid, methacrylic acid, orthophosphoric acid monoacrylate ester orthophosphoric acid monomethacrylate ester with one or more members selected from styrene; methyl, ethyl, n-butyl, isobutyl, 2-ethylhexyl, 2-hydroxyethyl, 2-hydroxypropyl and lauryl esters of acrylic acid or methacrylic acid; acrylonitrile, methacrylonitrile, acrylamide, methacrylamide, N-methylol acrylamide, N-methylol methacrylamide, diacetone acrylamide and diacetone methacrylamide. As the solvents for the polymerization, alcoholic solvents such as methanol, ethanol, propanol and butanol are preferable, however, most of the solvents such as ethyl acetate, ethylene glycol monomethyl ether and dioxane which dissolve the above high acid value polyvinyl resin and can be removed under reduced pressure of about 5 to about 20 mmHg at a temperature below about 120° C may be employed. As polymerization initiators, the conventional ones, namely peroxides such as benzoyl peroxide and lauroyl peroxide, and azo-compounds such as azobisisobutyronitrile and azobisvarelonitrile, and tert-butyl peroctate, can be used.

The above-mentioned monomer having both epoxy group and reactive unsaturated group is glycidyl arylate, glycidyl methacrylate and allylglycidyl ether. One member or more of the above monomers is caused to react with the above-mentioned high acid value polyvinyl resin in such an amount that the obtained unsaturated resin has an acid value of 20 to 60. Said reaction is carried out in the presence of thermal polymerization inhibitors such as hydroquinone, hydroquinone monomethyl ether, p-benzoquinone and 1,5-tert-butylphenol and catalysts for the addition reaction of the epoxy group and acid group such as triethylamine, tributylamine and tetraethylammonium chloride. The quantity of the above inhibitor is generally 100 to 2,000 ppm and that of the latter catalyst is about 0.5 to about 5% by weight based on the total weight of the resin composition.

The monomers of above 190° C in boiling point having reactive unsaturated group(s) used in the present invention are 2-hydroxyethyl, 2-hydroxypropyl or 3-hydroxypropyl acrylate or methacrylate; 2-ethylhexyl or lauryl acrylate or methacrylate; ethylene glycol, propylene glycol, polyethylene glycol, polypropylene glycol or 1,6-hexanediol diacrylate or dimethacrylate; trimethylolpropane or trimethylolethane triacrylate or trimethacrylate.

Furthermore, the bases used for the neutralization step in the method of the present invention are aqueous ammonia, inorganic salts such as sodium hydroxide and potassium hydroxide, ethanolamine, diethanolamine, triethanolamine, dimethylaminoethanol, diethylamine, triethylamine and diethylaminoethyl methacrylate.

In the method of the present invention, the number average molecular weight of the high acid value polyvinyl resin is restricted to the above-mentioned range because when the molecular weight is less than 10,000, a stable emulsion can not be produced and, on the other hand, when the molecular weight is more than 200,000, gelation is liable to occur during the addition reaction and the treatment under reduced pressure so that it becomes difficult to remove the solvents used for polymerization. The acid value of the high acid value polyvinyl resin is also restricted because the acid value and the unsaturation degree after the addition reaction should be limited within above-mentioned ranges. When the acid value of the unsaturated resin after the addition reaction is less than 20, stable emulsion cannot be formed even when the neutralization equivalent is increased, and when it is more than 60, the reaction product is liable to become water-soluble and the water resistance of the coating films formed therefrom will be suffer. When the unsaturation degree is less than 0.5, it becomes difficult to form a sufficiently cross-linked coating film, and when it is more than 3.0, gelation is liable to occur in the process. Furthermore, an unsaturation degree of more than 3.0 is not desirable in view of the film properties, especially physical properties. Still further, when less than 5 parts of the monomers of above 190° C in boiling point having reactive unsaturated group(s) are added to 100 parts of the resin, the viscosity cannot be decreased sufficiently, and accordingly it becomes difficult to remove the solvents used for polymerization, and after the coating, the flow of the coating film becomes worse and glossy surfaces are hardly obtained. On the other hand, when more than 60 parts of said monomers are added to 100 parts of the resin, the emulsion becomes unstable and the physical properties, especially impact resistance, of the coating film are adversely affected.

In other words, the object of the addition of said monomers is to facilitate the removal of volatile organic solvents under reduced pressure and to improve the smoothness of coated surfaces.

In the neutralization, if the amount of said base does not come within the range of 0.4 to 1.2 equivalent, stable emulsion cannot be formed regardless of the acid value before the neutralization.

When the emulsion prepared according to the method of the present invention is applied to the surfaces of substrates, it forms transparent films in about 10 minutes at room temperature or in a few minutes by the supply of hot air at 100° C to evaporate the water content. The formed transparent films are applied with electron beams or gamma rays in the next step to form cross-linked coating films which are insoluble to solvents. If a photosensitizer such as benzoin compounds, for example, bezoin methyl ether, benzoin ethyl ether, benzoin isopropyl ether and benzoin n-octyl ether and such as azo compounds, for example, azobisisobutyronitrile and azobisvarelonitrile is previously added to the emulsion in an amount of 1 to 10% by weight based on the total weight of the resin composition, the applied films can be cured by ultraviolet rays. In a manner similar to the conventional emulsion coating materials, the aqueous emulsion coating composition of the present invention can be used as clear paint or colored paint by adding suitable dyes or pigments. The cross-linked coating films obtained in the above are excellent in physical properties, especially impact resistance and water resistance and have smooth surfaces, and therefore the emulsion of the present invention can be used for a great variety of purposes.

In order that those skilled in the art may better understand the present invention and the manner in which it may be practised, the following specific examples are given.

EXAMPLE 1

A 3-liter four-neck flask equipped with a condenser, thermometer, stirrer, nitrogen supplying device and dropping funnel was fed with 1 kg of ethyl alcohol which was heated to 80° C with stirring. A mixture of acrylic monomers and a polymerization initiator shown in the following list was then added dropwise for 3 hours at 80° C with the supply of nitrogen gas.

| Methyl methacrylate | 100 g |
|---|---|
| Styrene | 100 g |
| n-Butyl acrylate | 498 g |
| Methacrylic acid | 172 g |
| 2-Hydroxyethyl acrylate | 130 g |
| tert-Butylperoctate | 5 g |

After the dropping of the above mixture, the contents of the flask were allowed to react at 80° C for a further 2 hours and the following additional catalyst solution was then added dropwise for 30 minutes.

| tert-Butylperoctate | 1.0 g |
|---|---|
| Ethanol | 10 g |

After the dropping of the above catalyst solution, the reaction mixture was further allowed to react at 80° C for 3 hours to obtain a high acid value polyvinyl resin. The following compounds were then added to the resin and allowed to react at 80° C.

| Glycidyl methacrylate | 142 g |
|---|---|
| Tetraethylammonium chloride | 2 g |
| p-Benzoquinone | 1 g |

When the acid value became 50, 100 g of 2-hydroxyethyl acrylate was added and ethanol was removed under reduced pressure of 20 mmHg at the same temperature.

EXAMPLE 2

The following monomers were copolymerized under the same conditions and with the same apparatus as those in the foregoing Example 1, in which n-butanol was used as solvent.

| Acrylic amide | 130 g |
|---|---|
| iso-Butyl acrylate | 480 g |
| 2-Ethylhexyl methacrylate | 102 g |
| Acrylic acid | 288 g |
| Benzoyl peroxide | 20 g |

After the above reaction, the following compounds were added to the reactive mixture and allowed to react at 120° C.

| Glycidyl acrylate | 256 g |
|---|---|
| Allylglycidyl ether | 172 g |
| Triethylamine | 15 g |
| Hydroquinone | 1 g |

When the resin acid value became 20, 560 g of 3-hydroxypropyl acrylate was added and the pressure was reduced to 10 mmHg at the same temperature by a vacuum pump so as to remove the n-butanol.

EXAMPLE 3

The unsaturated resin was produced in the same materials and manner as in the foregoing Example 1 except that the 100 g of 2-hydroxyethyl acrylate was not added to the reaction product.

COMPARATIVE EXAMPLE 1

In like manner as Example 1, the following monomers were copolymerized by using ethyl acetate as solvent at the reaction temperature of 80° C.

| Ethyl acrylate | 730 g |
|---|---|
| Styrene | 180 g |
| Acrylic acid | 90 g |

The following compound was added to the above obtained raw material resin in like manner as Example 1 and allowed to react at 80° C.

| Glycidyl methacrylate | 142 g |
|---|---|

When the resin acid value became 15, 100 g of 1,6-hexanediol was added and the pressure was reduced to 20 mmHg at the same temperature so as to remove the ethyl acetate.

The results of the foregoing reactions are shown in the following Table 1.

Table 1

| Item | Example 1 | Example 2 | Example 3 | Comparative Example 1 |
|---|---|---|---|---|
| Acid value of polyvinyl resin | 112 | 223 | 112 | 70 |
| Acid value after addition reaction | 50 | 20 | 50 | 15 |
| Resin content after solvent removal under reduced pressure (Total amount of unsaturated resin and monomers having boiling points above 190° C) | 98% | 99% | 95% | 97% |

The above unsaturated resin were dispersed into water with the following conditions.

(1)-A

The unsaturated resin obtained in Example 1 was neutralized with 1.0 equivalent of aqueous ammonia and the neutralized product was dispersed into 2 kg of water.

(1)-B

The unsaturated resin obtained in Example 1 was neutralized with 0.5 equivalent of aqueous ammonia and the neutralized product was dispersed into 2 kg of water.

(1)-C

The unsaturated resin obtained in Example 1 was mixed with 5 g of benzoin and 1.2 equivalents of aqueous ammonia was then added thereto, and their neutralized product was dispersed into 2 kg of water.

(2)-A

The unsaturated resin obtained in Example 2 was neutralized with 1.0 equivalent of diethanolamine and the neutralized product was dispersed into 2 kg of water.

(2)-B

The unsaturated resin obtained in Example 2 was neutralized with 0.3 equivalent of triethylamine and the neutralized product was dispersed into 2 kg of water.

(3)-A

The unsaturated resin obtained in Example 1 was neutralized with 1.0 equivalent of aqueous ammonia and the neutralized product was dispersed into 2 kg of water.

(4)-A

The unsaturated resin obtained in Comparative Example 1 was neutralized with 1.2 equivalents of aqueous ammonia and the neutralized product was dispersed into 2 kg of water.

The emulsions prepared in the above procedures were stored for 10 days and those kept in good conditions were applied to the surfaces of mild steel sheets to form coating films of 30 microns in thickness. The coating films were then subjected to setting for 10 minutes at room temperature. The conditions after the storing and the states of dispersions after the 10 minutes' setting are shown in the following Table 2.

Table 2

| Tests | State of dispersion after 10 days' storage | State of dispersion after 10 minutes' setting |
| --- | --- | --- |
| (1)-A | Translucent | Transparent, Glossy |
| (1)-B | Milky | Transparent, Delustering |
| (1)-C | Translucent | Transparent, Glossy |
| (2)-A | Translucent | Transparent, Glossy |
| (2)-B | Separated | — |
| (3)-A | Translucent | Transparent, Glossy |
| (4)-A | Separated | — |

After the above-mentioned setting, the coating films except (1)-C were cured by 10 MR of electron beams, while the coating film (1)-C was cured by ultraviolet rays applied for 2 minutes by using a 2 kw high pressure mercury lamp placed at a position 30 cm apart. The test results of the above cured coatings are shown in the following Table 3.

Table 3

| Tests | Hardness | Adhesion | Impact Resistance (DuPont, ½ in.Φ,500g) | Water Resistance (40° C, 20 days) |
| --- | --- | --- | --- | --- |
| (1)-A | 2H | 100/100 | >50 cm | No change |
| (1)-B | 2H | 100/100 | 40 cm | No change |
| (1)-C | H | 100/100 | >50 cm | Slightly losing of gloss |
| (2)-A | H | 100/100 | 30 cm | No change |
| (3)-A | 2H | 100/100 | >50 cm | No change |

It will be understood from the foregoing description and examples that the unsaturated resin emulsion of the present invention is excellent. It should be emphasized, however, that the specific examples described and shown herein are intended as merely illustrative and in no way restrictive of the invention.

Properties of the coating composition and coated film are determined in accordance with the following methods:

1. Pencil Hardness

Leave a coated panel to stand in a constant temperature and constant humidity chamber at a temperature of 20° C and a humidity of 75% for 1 hour. Full sharpen a pencil (trade mark "UNI," product of Mitsubishi Pencil Co., Ltd., Japan) by a pencil sharpener and then wear away the sharp pencil point to flatness. Firmly press the pencil against the coating surface of the coated panel at an angle of 45° between the axis of the pencil and the coating surface and push the pencil forward at a constant speed of 3 sec/cm as positioned in this state. Repeat the same procedure 5 times with each of pencils having various hardness. The hardness of the coating is expressed in terms of the highest of the hardnesses of the pencils with which the coating remain unbroken at more than four strokes.

2. Adhesion

After leaving a test panel to stand in a constant temperature and constant humidity chamber at a temperature of 20°±1° C and a humidity of 75% for 1 hour, make 11 parallel cuts, 1 mm apart, in the coating film up to the surface of aluminum alloy substrate, using a single-edged razor blade. Make a similar set of cuts at right angles to the first cut to form 100 squares. Using an Erichsen film tester, push out the test panel 5 mm and apply a piece of cellophane adhesive tape to the pushed out portion. Press the tape firmly from above and thereafter remove the tape rapidly. The evaluation is expressed by a friction in which the denominator is the number of squares formed and the numerator is the number of squares left unremoved. Thus 100/100 indicates that the coating remain completely unremoved.

3. Du Pont Impact Resistance

After leaving a coated panel to stand in a constant temperature and constant humidity chamber at a temperature of 20° C and a humidity of 75% for 1 hour, the following test is conducted in the same chamber. A bearer and a centor of impact of prescribed sizes are fitted to a Du Pont impact testor and the panel is put between them, turning the coated surface of the panel upward. The prescribed weight is dropped on the center of impact from the prescribed height, the panel is taken out, and after having been left for an hour in the room and, the damage of surface is observed. The largest height (cm) of the weight entailing no cracking in the coating is determined.

(4) Water Resistance

The coated panel is immersed in water at 40° C for 20 days, the state of coating film is observed.

What is claimed is:

1. A process for producing an aqueous emulsion of unsaturated resin which comprises the steps of: synthesizing polyvinyl resin having an acid value of 50 to 230 and a number average molecular weight of 10,000 to 200,000 by means of solution copolymerization of at least one acid monomer selected from the group consisting of acrylic acid, methacrylic acid, orthophosphoric acid monoacrylate ester and orthophosphoric acid monomethacrylate ester with at least one compound selected from the group consisting of styrene; methyl, ethyl, n-butyl, isobutyl, 2-ethylhexyl, 2-hydroxyethyl, 2-hyroxypropyl and lauryl ester of acrylic acid; methyl, ethyl, n-butyl, isobutyl, 2-ethylhexyl, 2-hydroxyethyl, 2-hydroxypropyl and lauryl ester of methacrylic acid; acrylonitrile; methacrylonitrile; acrylamide; methacrylamide; N-methylol acrylamide; N-methylol methacrylamide; diacetone acrylamide; and diacetone methacrylamide; adding at least one monomer having epoxy group and reactive unsaturated group selected from the group consisting of glycidyl acrylate, glycidyl methacrylate and allylglycidyl ether to said polyvinyl resin to produce unsaturated resin having an acid value of 20 to 60 and an unsaturation degree of 0.5 to 3.0, removing the polymerization solvent under reduced pressure, neutralizing residual acid groups with 0.4 to 1.2 equivalent of base and dispersing the neutralized product into water.

2. A process for producing an aqueous emulsion of unsaturated resin as claimed in claim 1, in which the number average molecular weight of the polyvinyl resin is 40,000 to 100,000.

3. A process for producing an aqueous emulsion of unsaturated resin as claimed in claim 1, in which a photosensitizer is added to said emulsion.

4. A process for producing an aqueous emulsion of unsaturated resin as claimed in claim 1, in which said polyvinyl resin is produced by copolymerizing methyl methacrylate, styrene, n-butyl acrylate, methacrylic acid and 2-hydroxyethyl acrylate, and wherein said monomer having an epoxy group and reactive unsaturated group is glycidyl acrylate.

5. A process for producing an aqueous emulsion of unsaturated resin as claimed in claim 1, in which said polyvinyl resin is produced by copolymerizing acrylamide, isobutyl acrylate, 2-ethylhexyl methylate, and acrylic acid, and wherein said monomer having epoxy group and reactive unsaturated group is a mixture of glycidyl acrylate and allylglycidyl ether.

6. A process for producing an aqueous emulsion of unsaturated resin which comprises the steps of: synthesizing polyvinyl resin having an acid value of 50 to 230 and a number average molecular weight of 10,000 to 200,000 by means of solution copolymerization of at least one acid monomer selected from the group consisting of acrylic acid, methacrylic acid, orthophosphoric acid monoacrylate ester and orthophosphoric acid monomethyacrylate ester with at least one compound selected from the group consisting of styrene; methyl, ethyl, n-butyl, isobutyl, 2-ethylhexyl, 2-hydroxyethyl, 2-hydroxypropyl and lauryl ester of acrylic acid; methyl, ethyl, n-butyl, isobutyl, 2-ethylhexyl, 2-hydroxyethyl, 2-hydroxypropyl and lauryl ester of methacrylic acid; acrylonitrile; methacrylonitrile; acrylamide; methacrylamide; N-methylol acrylamide; N-methylol methacrylamide; diacetone acrylamide; and diacetone methacrylamide; adding at least one monomer having epoxy group and reactive unsaturated group selected from the group consisting of glycidyl acrylate, glycidyl methacrylate and allylglycidyl ether to said polyvinyl resin to produce unsaturated resin having an acid value of 20 to 60 and an unsaturation degree of 0.5 to 3.0, mixing 5 to 60 parts of at least one monomer of above 190° C in boiling point having reactive unsatuated group selected from the group consisting of 2-hydroxyethyl, 2-hydroxypropyl, 3-hydroxpropyl, 2-ethylhexyl and lauryl ester of acrylic acid; 2-hydroxyethyl, 2-hydroxypropyl, 3-hydroxypropyl, 2-ethylhexyl and lauryl ester of methacrylic acid; diacrylate of ethylene glycol, diethylene glycol, propylene glycol, polyethylene glycol, polypropylene glycol, neopentyl glycol, and 1,6-hexanediol; dimethacrylate of ethylene glycol, diethylene glycol, propylene glycol, polyethylene glycol, polypropylene glycol, neopentyl glycol and 1,6-hexandiol; triacrylate of trimethylolpropane and trimethylolethane; and trimethacrylate of trimethylolpropane and trimethylolethane; to 100 parts of above unsaturated resin, removing the polymerization solvent under reduced pressure, neutralizing residual acid groups with 0.4 to 1.2 equivalent of base and dispersing the neutralized product into water.

7. A process for producing an aqueous emulsion of unsaturated resin as claimed in claim 6, in which a photosensitizer is added to said emulsion.

8. A process for producing an aqueous emulsion of unsaturated resin as claimed in claim 6, in which the number average molecular weight of the polyvinyl resin is 40,000 to 100,000, and in which the amount of monomer of above 190° C in boiling point is 10 to 30 parts.

* * * * *